United States Patent
Leblanc

(10) Patent No.: US 8,687,753 B1
(45) Date of Patent: Apr. 1, 2014

(54) FAST SYNCING METHOD OF HANDLING DATA

(71) Applicant: Hamilton Sundstrand Corporation, Windsor Locks, CT (US)

(72) Inventor: Paul J. Leblanc, Thomaston, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/655,791

(22) Filed: Oct. 19, 2012

(51) Int. Cl.
*H04L 7/00* (2006.01)

(52) U.S. Cl.
USPC ........... 375/365; 375/354; 375/316; 375/357; 375/359; 375/366; 375/368

(58) Field of Classification Search
USPC .......... 375/354, 316, 357, 359, 365, 366, 368
See application file for complete search history.

(56) References Cited

U.S. PATENT DOCUMENTS

| | | |
|---|---|---|
| 6,151,567 A | 11/2000 | Ames et al. |
| 6,896,480 B1 | 5/2005 | Hagshenas et al. |
| 7,464,237 B2 | 12/2008 | Accapadi et al. |
| 7,861,051 B2 | 12/2010 | Accapadi et al. |
| 8,111,734 B2 | 2/2012 | Wang et al. |
| 8,166,343 B2 | 4/2012 | Hess et al. |
| 8,249,130 B2 | 8/2012 | Hulvey |
| 8,270,436 B2 | 9/2012 | Huang et al. |
| 8,284,881 B2 | 10/2012 | Witters et al. |
| 2008/0062829 A1 * | 3/2008 | Yang ............................ 369/47.1 |

* cited by examiner

*Primary Examiner* — Siu Lee
(74) *Attorney, Agent, or Firm* — Carlson, Gaskey & Olds, PC

(57) ABSTRACT

A method of syncing a serial data stream includes the step of providing a data stream having frames and sub-frames. Each sub-frame is provided with an expected SYNC Word, and there is an expected offset between the SYNC Words in each sub-frame. The data is sent to a plurality of sync modules. Each sync module searches for an expected and different one of the SYNC Words. The sync modules identify an expected SYNC Word, then look for a different one of the SYNC Words at said expected offset from its expected SYNC Word to verify that it has properly identified a SYNC Word.

10 Claims, 3 Drawing Sheets

FAST SYNCING METHOD OF HANDLING DATA

BACKGROUND

This application relates to a way of identifying SYNC Words in each of a plurality of sub-frames of information in a data stream.

Modern systems are creating increasingly high volumes of data. In general, data will often come in a continuous serial data stream. Within the data stream, there are SYNC Words which can be utilized to identify a start point of a sub-frame of information. As an example, in one known system, a frame of data may come with four sub-frames of information. To properly evaluate or utilize this data, a controller must identify a start point for each sub-frame within the data stream.

It is known to insert expected SYNC Words within sub-frames in the frame. A SYNC word is generally known in the art to be a preamble that is used to synchronize a transmission by indicating the start of data. A controller then looks for an expected SYNC Word, and can identify a beginning point of each sub-frame.

However, due to the binary nature of the data, within any one sub-frame of information it is possible for there to be plural occurrences of the expected SYNC Word. The random generation of a combination that would equate to a SYNC Word by otherwise generated data is not only possible, it becomes probable with very high flow of data.

Modern systems are relatively slow to react to a mistaken identification of a SYNC Word.

SUMMARY

A method of syncing a serial data stream includes the step of providing a data stream having frames and sub-frames. Each sub-frame is provided with an expected SYNC Word, and there is an expected offset between the SYNC Words in each sub-frame. The data is sent to a plurality of sync modules. Each sync module searches for an expected and different one of the SYNC Words. The sync modules identify an expected SYNC Word, then look for a different one of the SYNC Words at said expected offset from its expected SYNC Word to verify that it has properly identified a SYNC Word.

These and other features of this application may be best understood from the following drawings and specification, the following of which is a brief description.

DETAILED DESCRIPTION

Figure 1:
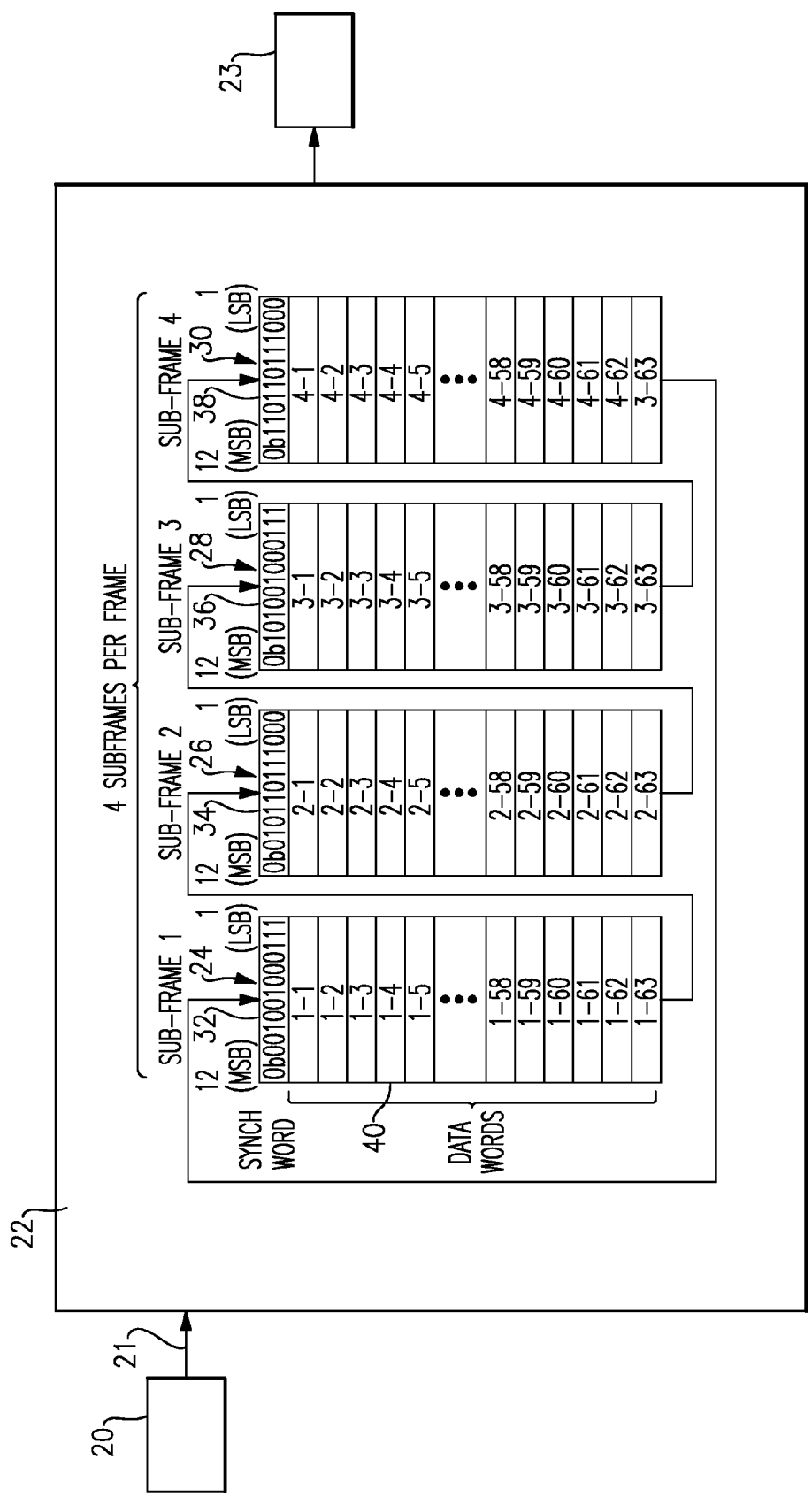
FIG. 1 schematically shows a serial data stream.

FIG. 1 shows a data generating system 20 sending a data stream 21 toward a controller/recorder 23. As shown, a frame of information 22 includes sub-frames 24, 26, 28 and 30. Each of the sub-frames includes a SYNC Word 32, 34, 36, and 38. The SYNC Words 32-38 are known, and expected, and provide the controller/recorder 23 with an identification of when each sub-frame begins. Without identifying the location of a SYNC Word, it is impossible to identify where a particular piece of information within the data stream 21 begins and ends.

However, as mentioned above, it is possible within any one of the sub-frames, say sub-frame 24, that another Word, for example the one identified at 40, could be identical to any one of the SYNC Words 32, 34, 36, and 38.

Figure 2:
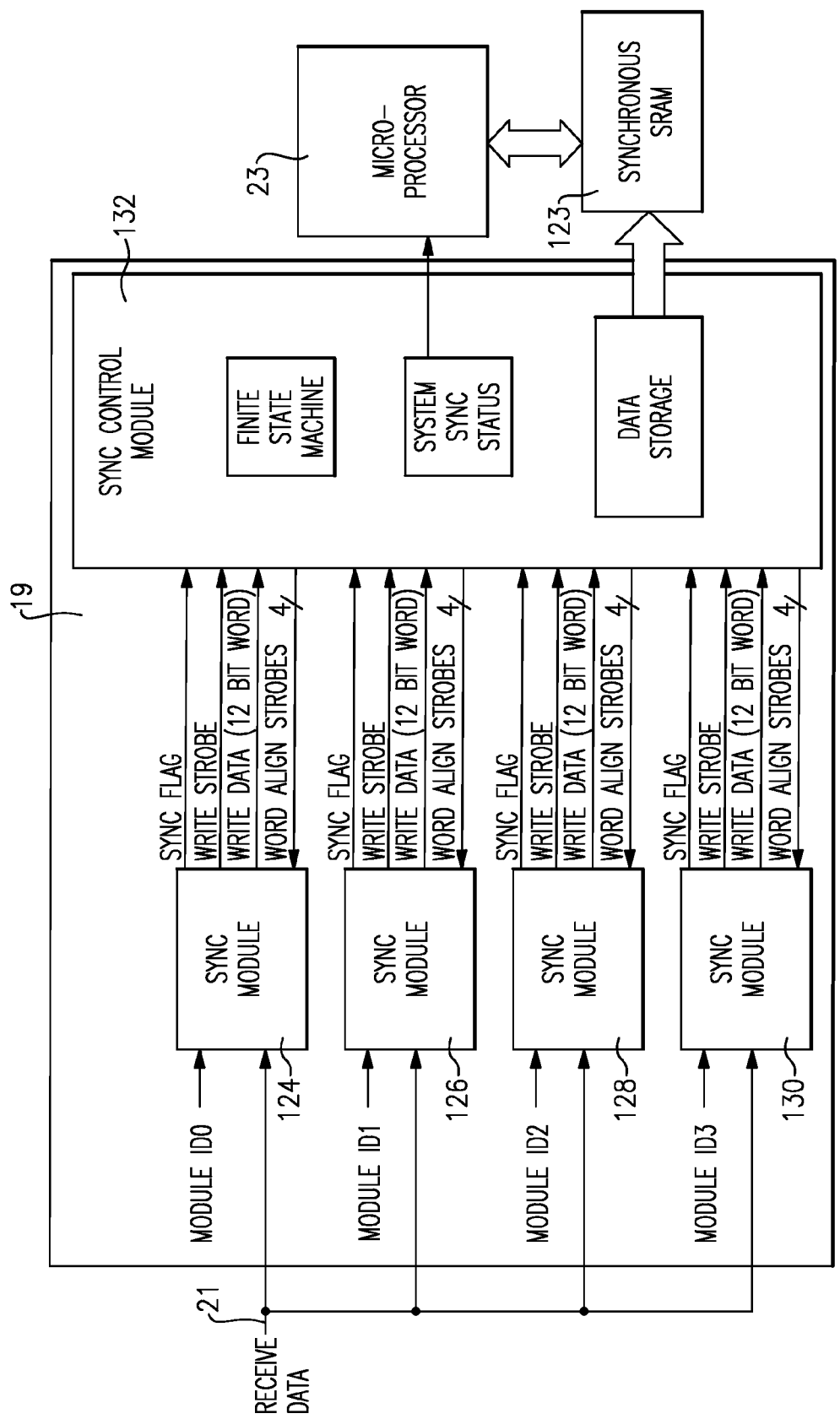
FIG. 2 shows a detection module.

FIG. 2 shows a system for quickly and more accurately identifying the SYNC Words, and thus being able to sync the data stream. It is known that there is a predetermined period of time between the expected arrival of each of the SYNC Words 32, 34, 36, and 38. In one system having four sub-frames, there is one second between the arrivals of each SYNC Word.

As shown in FIG. 2, a sync system 19 is included, and has four sync modules 124, 126, 128, and 130. Generally, the sync system 19 may be located on a common component where the data stream 21 is generated. As an example, this may all occur on an aircraft.

Each module receives the data stream 21. The four modules 124, 126, 128, and 130 each begin by looking for an individual one of the SYNC Words 32, 34, 36, and 38, as shown in FIG. 1. That is, the sync module 124 would first look for the SYNC Word 32, the sync module 126 first looks for the SYNC Word 34, the sync module 128 first looks for the SYNC Word 36 and sync module 130 first looks for SYNC Word 38.

Now, the sync module 126, for example, identifies plural occurrences of the SYNC Word 34 in the data stream 21. It will look at these individually, and look to see whether the next expected SYNC Word, 36 in this example, occurs at one second after each identified SYNC Word 34.

While it is probable that plural occurrences of any one of the SYNC Words could occur within the data stream 21, it is also likely that plural occurrences will not occur for all of the SYNC Words. Since the several sync modules 124, 126, 128 and 130 are each looking for individual ones of the SYNC Words, it is thus likely that syncing will occur more quickly by looking for plural ones of the SYNC Words in parallel.

Once any one of the modules 124, 126, 128 and 130 have properly synced all four of the SYNC Words, a signal or flag can be sent to a control module 132. As explained below, proper syncing is identified once all SYNC Words have been detected in the correct order and data location. It is also to be appreciated that each module 124-130 starts searching for a different SYNC word for an entire sub-frame of data. The control module 132 communicates with the microprocessor 23 (controller/recorder) and memory 123. The modules 124, 126, 128 and 130 and control module 132 are all provided as part of a field programmable gate array, in one embodiment.

While this system can be utilized for any number of applications, it is particularly disclosed for use with a flight data recorder for use in an aircraft. In such a system the component that is the data generator 20 is the aircraft.

Figure 3:
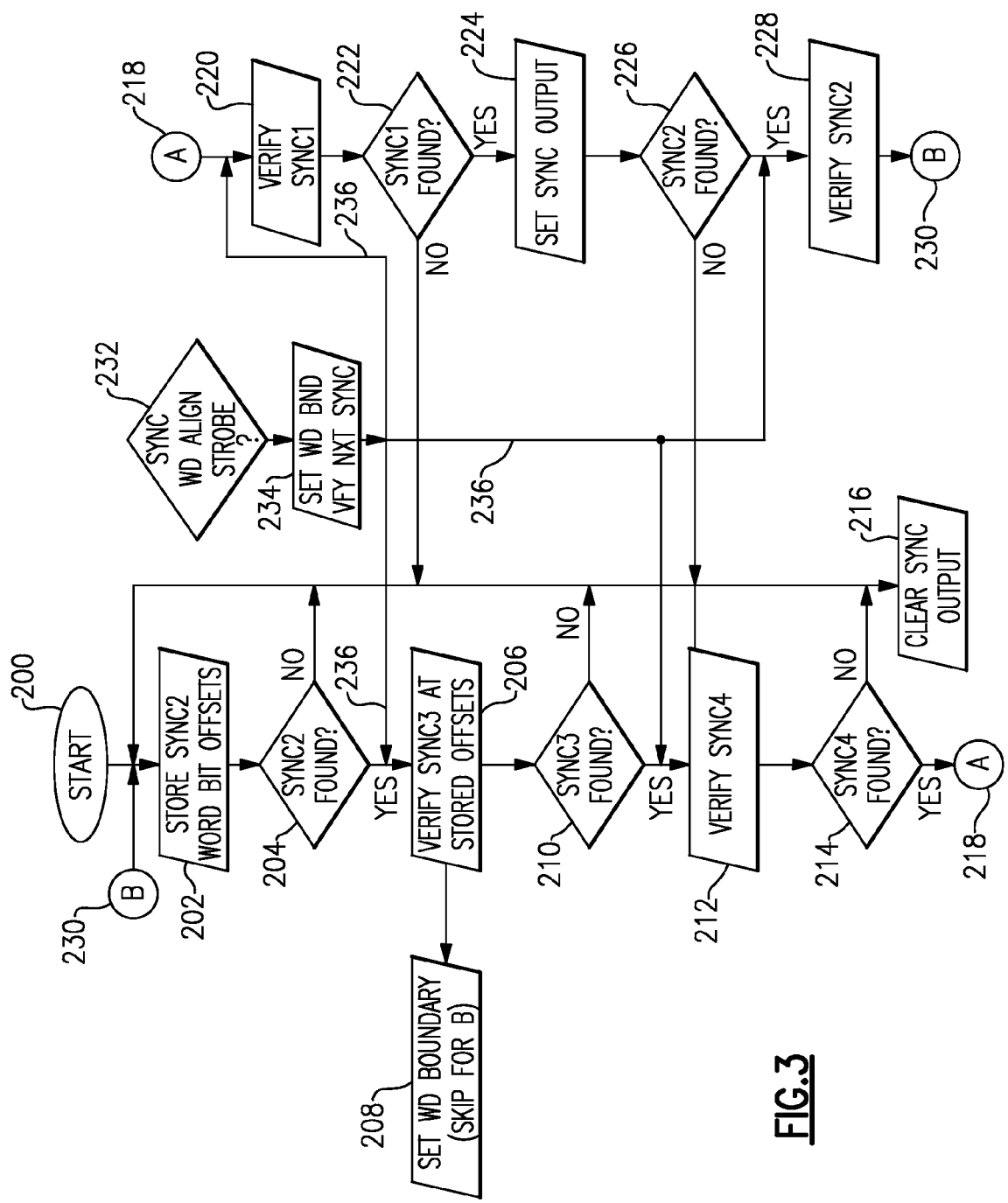
FIG. 3 is a flow chart.

FIG. 3 is a flow chart of the method of this invention. The method is performed on the field programmable gate array and includes a processor having, in one non-limiting embodiment, pre-programmed instructions to synchronize the data stream and output the information to the sync control module 132. At start 200, sync module 126 stores the second SYNC Word (34) at step 202. If no occurrences are found, then at step 204 the system returns to the start point 200. However, if the SYNC Word 2 (34) is found, then at 206 the method looks for the SYNC Word 3 (36) at the expected offset (one second in this example).

Prior to finding SYNC word 2, the serial data stream has no word boundaries and all possible 12-bit combinations are examined for SYNC detection. After finding the SYNC word 2, the SYNC module establishes a 12 bit word boundary at step 208 to collect and compare future SYNC words at the one second boundaries.

If the SYNC Word 3 (36) is found at step 210, then the method looks for the SYNC Word 4 (38) at step 212. If step 210 does not identify SYNC Word 3 at the expected offset than it returns to start at 200.

If the SYNC Word 4 (38) is found at step at 214, then the method moves to point A at step 218. If it does not, then it clears the sync output at step 216 and returns to start 200.

From step 218 the method then looks for first SYNC Word (32) at step 220. If the SYNC Word is found at 222, than all four SYNC Words have been found in the expected offset, and the sync output is set at step 224. However, the module returns to looking for the second SYNC Word at step 226, verifies it step 228, and returns to start at step 230.

Once any of the sync modules has fully synchronized the data stream, the sync controller 132 relies upon the synchronization provided by that one sync module.

While this flow chart explains the operation of the module 126, the other modules 124, 128, and 130 all operate in a similar fashion, however, each beginning with their individual and different SYNC Words.

The SYNC Control Module 132 monitors the SYNC FLAG signal from each of the four SYNC modules. After a SYNC Module has acquired all four SYNC words, it will set its SYNC FLAG signal active and begin to send valid data words (WRITE DATA) to the SYNC Control Module as they are acquired. The SYNC Control Module will accept 12 bit-data words from appropriate SYNC module using the WRITE STROBE as a flag for when valid data word is present. After at least one SYNC Module has set its' SYNC Flag active, the SYNC Control Module can word align the other SYNC Modules to any SYNC word by setting the appropriate WORD ALIGN STOBE at the correct time. The SYNC Control Module also writes the WRITE DATA to a SYNCHRONOUS RAM 132 and alerts the MICROPROCESSOR 23 when a complete SUB-FRAME of data resides in SYNCHRONOUS SRAM.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of syncing a serial data stream comprising the steps of:
   providing a data stream including frames and sub-frames with each said sub-frame being provided with an expected SYNC Word, and there being an expected offset between said SYNC Words in each said plural sub-frame;
   sending said data stream to a plurality of sync modules with each of said sync modules searching for an expected and different one of said SYNC Words, and each said module identifying its expected SYNC Word, then looking for a different one of said SYNC Words at said expected offset from its expected SYNC Word to verify that it has properly identified the SYNC Word.

2. The method as set forth in claim 1, wherein said SYNC Words are offset by a predetermined time.

3. The method of claim 1, wherein there are at least four said sub-frames in each frame, and each of said sub-frames being provided with a SYNC Word, and there being an individual one of said sync modules for each of said SYNC Words.

4. The method as set forth in claim 1, wherein the data stream is generated on an aircraft, and sent to a controller, downstream of said sync models.

5. The method of claim 1, wherein a sync controller receives a signal from any one of said sync modules which has synchronized the SYNC Words in at least a plurality of said sub-frames, and said sync control module relying upon said any one of said sync modules which has synchronized the date stream to synchronize the data stream.

6. A system comprising:
   a component for generating a serial data stream, said data stream passing into a sync system, and then to a controller;
   the data stream including frames and sub-frames with each said sub-frame provided with an expected SYNC Word, and there being an expected offset between said SYNC Words in each said plural sub-frame; and
   said sync system including a plurality of sync modules with each of said sync modules searching for an expected and different one of said SYNC Words, and each said module identifying its expected SYNC Word, then looking for a different one of said SYNC Words at said expected offset from its expected SYNC Word to verify that it has properly identified with a SYNC Word.

7. The system as set forth in claim 6, wherein said SYNC Words are offset by a predetermined time.

8. The system as set forth in claim 6, wherein there are at least four said sub-frames in each frame, and each of said sub-frames being provided with a SYNC Word, and there being an individual one of said sync modules for each of said SYNC Words.

9. The system as set forth in claim 6, wherein the data stream is generated on an aircraft, and sent to a controller, downstream of said sync models.

10. The system as set forth in claim 6, wherein a sync controller receives a signal from any one of said sync modules which has synchronized the SYNC Words in at least a plurality of said sub-frames, and said sync control module relying upon said any one of said sync modules which has synchronized the date stream to synchronize the data stream.

* * * * *